United States Patent Office 3,549,635
Patented Dec. 22, 1970

---

3,549,635
PREPARATION OF SUBSTITUTED-2(1H)-QUINAZO-LINONES
Hans Ott, Convent Station, N.J., assignor to Sandoz-Wander, Inc., Hanover, N.J., a corporation of Delaware
No Drawing. Filed July 1, 1968, Ser. No. 741,806
Int. Cl. C07d *51/48*
U.S. Cl. 260—251                                       14 Claims

ABSTRACT OF THE DISCLOSURE

This invention discloses processes for preparation of 1,4-substituted-2(1H)-quinazolinones by reacting a 2-aminobenzophenonimine with a carbonic acid derivative, e.g., phosgene. The quinazolinones are useful as pharmaceuticals, e.g., as anti-inflammatory agents. Also disclosed is process for production of substituted 2-nitrobenzonitriles useful as intermediates in the preparation of certain 2-aminobenzophenonimines, said 2-nitrobenzonitriles being prepared by subjecting an o-halonitrobenzene to reaction with cuprous cyanide in an organic solvent at elevated temperatures, followed by hydrolysis.

---

This invention relates to preparation of 1,4-substituted-2(1H)-quinazolinones, and also to preparation of certain substituted 2-nitrobenzonitriles useful as intermediates in production of certain of said quinazolinones.

Various processes for preparation of 1,4-substituted-2(1H)-quinazolinones have been described in my copending application Ser. No. 707,932, filed Feb. 26, 1968, now abandoned. Such 1,4-substituted-2(1H)-quinazolinones are of special interest because of exhibiting pharmacological activity.

An object of the present invention is to provide new processes for preparation of 1,4-substituted-2(1H)-quinazolinones.

Another object is to provide a new method for preparation of intermediates useful in the preparation of 1,4-substituted-2(1H)-quinazolinones.

Other objects and advantages will be evident from the following description of the invention.

In accordance with one aspect of the present invention, it has been found that 1,4-substituted-2(1H)-quinazolinones of the general Formula I:

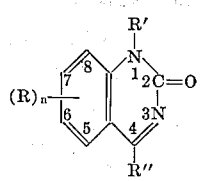

wherein:

R represents hydrogen; halo, preferably having an atomic weight no greater than 80, i.e., fluoro, bromo and chloro; lower alkyl, preferably containing 1 to 5 carbon atoms; lower alkoxy, preferably containing 1 to 4 carbon atoms; nitro; cyano; lower alkylthio where the alkyl is of 1 to 4 carbon atoms; or trifluoromethyl;
n is 1 or 2, and when 2, then R is the same or different and either hydrogen, halo, lower alkyl or lower alkoxy, as defined above;
R′ represents lower alkyl, preferably containing from 1 to 5 carbon atoms, e.g., methyl, ethyl, propyl, isopropyl, butyl, sec-butyl, isobutyl and tertiary butyl; allyl; methallyl; or propargyl;

R″ represents phenyl; or substituted phenyl of the formula

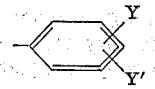

Y represents halo; lower alkyl, preferably containing from 1 to 4 carbon atoms, e.g., methyl, ethyl, propyl, and butyl; lower alkoxy, preferably containing from 1 to 4 carbon atoms, e.g., methoxy, ethoxy, propoxy and butoxy; or trifluoromethyl; and
Y′ represents hydrogen; halo; lower alkyl, preferably containing from 1 to 4 carbon atoms, e.g., methyl, ethyl, propyl and butyl, or lower alkoxy preferably containing from 1 to 4 carbon atoms, e.g., methoxy, ethoxy, propoxy and butoxy, are prepared by cyclizing a 2-aminobenzophenonimine of the Formula II:

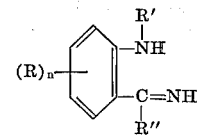

wherein R, R′, R″ and n are as above-defined.

More particularly, compounds I may be produced in accordance with the invention by reactively combining a compound II with a carbonic acid derivative selected from the group of:

(a) phosgene,
(b) a lower alkyl (1 or 2 carbon atoms) chlorocarbonate, i.e., methyl or ethyl chlorocarbonate,
(c) urethane, and
(d) 1,1′-carbonyldiimidazole;

provided that the cyclizing carbonic acid derivative is phosgene when R′ in compound II is a branched tertiary alkyl having a tertiary carbon atom attached directly to the ring nitrogen atom. In general, the production of compounds I by cyclization of a compound II in accordance with the invention proceeds at good rates and the resulting compounds I may be obtained from the reaction mixture by working up in a conventional manner.

(A) CYCLIZATION WITH PHOSGENE

The production of compound I by reaction of a compound II with phosgene may be carried out at temperatures in the range of 0° C. to 50° C., preferably 10° C. to 30° C. The preferred inert organic solvents are aromatic hydrocarbons, e.g., benzene, toluene, xylene and the like, more preferably benzene. The mole ratio of phosgene to compound II is not particularly critical and a substantial excess of phosgene is employed in the preferred forms of practice to obtain the more efficient reaction rates. The cyclization with phosgene has the further particular advantage of being applicable to the production of compounds I having a tertiary carbon atom attached directly to the ring nitrogen, such compounds I being produced in high yield by said process.

(B) CYCLIZATION WITH A LOWER ALKYL CHLOROCARBONATE

The production of compound I by reaction of a compound II with methyl chlorocarbonate or ethyl chlorocarbonate, preferably ethyl chlorocarbonate, may be carried out at temperatures in the range of 30° C. to 150° C., preferably 60° C. to 100° C. The preferred inert organic solvents are the aromatic hydrocarbons, e.g., benzene, toluene, xylene and the like, more preferably benzene. It will be evident that other well-known suitable inert organic solvents, e.g., dioxane, may be used. The mole ratio of ethyl chlorocarbonate to compound II is not critical and the reaction is preferably carried out with a substantial excess of the chlorocarbonate. Reaction time is usually in the range of ½ to 10 hours, more usually 1 to 4 hours. The cyclization with the chlorocarbonate may be optionally carried out in the presence of an inorganic base, e.g., sodium carbonate or potassium carbonate, or a tertiary amine, e.g., a trialkyl amine or pyridine, more preferably triethylamine.

(C) CYCLIZATION WITH URETHANE

The production of compound I by reaction of a compound II with urethane may be carried out at temperatures in the range of 140° C. to 200° C., preferably 160° C. to 180° C. The mole ratio of urethane to compound II is not critical. In the preferred forms of practice, there is employed a substantial excess of urethane which also serves as the preferred solvent for the reaction. Other suitable well-known inert high boiling organic solvents may also be employed, if desired. Reaction time is usually in the range of ½ to 10 hours, more usually 1 to 4 hours. The cyclization with urethane is optionally and preferably conducted in the presence of a Lewis acid as catalyst for the reaction. The amount of Lewis employed is preferably between about 5% to 20% based on the weight of compound II in the reaction mixture. The preferred catalyst is zinc chloride.

(D) CYCLIZATION WITH 1,1'-CARBONYL-DIIMIDAZOLE

The production of compound I by reaction of a compound II with 1,1'-carbonyldiimidazole may be carried out at temperatures in the range of 20° C. to 120° C., preferably at a temperature between 60° C. to 90° C. The reaction is preferably carried out in an inert solvent medium, more preferably in an inert aromatic hydrocarbon, e.g., benzene, toluene, or xylene, especially benzene. The mole ratio of 1,1'-carbonyldiimidazole to compound II is not particularly critical and excess 1,1'-carbonyldiimidazole may be used to advantage in the more preferred modes of practice. The product compound I may be obtained from the reaction mixture by conventional procedures.

The o-aminobenzophenonimines of Formula II employed in the invention either are known or can be prepared from available materials by one or more of a number of well established procedures, as will be evident to those skilled in the art. In general, the compounds of Formula II may be produced from a corresponding o-aminobenzophenone of Formula IIA:

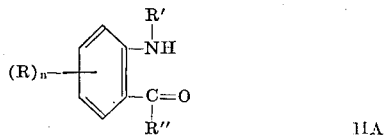

IIA wherein R, R', R" and $n$ are as above-defined, by reacting said o-aminobenzophenone with ammonia. Such reaction with ammonia is desirably carried out in a sealed reactor under anhydrous conditions and at elevated temperatures and pressures. Reaction temperatures are suitably in the range of 100° C. to 200° C., preferably 110° C. to 150° C. A catalyst such as a Lewis acid, e.g., zinc chloride, may be employed to advantage in the process. The reaction is preferably carried out with ammonia as solvent, or with a suitable co-solvent, e.g., dioxane, followed by recovery in a conventional manner.

The o-aminobenzophenones which are compounds IIA and reacted with ammonia to obtain compounds II are likewise either known or can be prepared from available materials by procedures known in the art. In situations where R is 5-nitro or 5-trifluoromethyl in compounds IIA, it is preferred to prepare such compounds by reaction of the corresponding 5-R (nitro or trifluoromethyl)-2-chlorobenzophenone with an appropriate amine (R'NH$_2$) in the presence of a suitable catalyst, such as a mixture of copper and cuprous chloride.

Compounds II may be prepared by other procedures heretofore well known, for example, by tosylation, alkylation and detosylation of an anthranilonitrile of the Formula III:

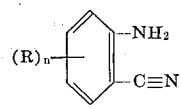

III wherein R (excluding nitro and cyano) and $n$ are as previously defined, to obtain a 2-aminobenzonitrile of the Formula IV:

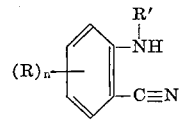

IV wherein R, R' and $n$ are as defined above for this procedure, said compound IV then being reacted according to known reaction procedures with a phenyl Grignard compound of Formula V or phenyllithium compound of Formula VI, as follows:

$$R''MgBr \quad\quad\quad (V)$$

$$R''Li \quad\quad\quad (VI)$$

wherein R" is as above-defined, followed by controlled alkaline hydrolysis in a conventional manner, to obtain the compounds of Formula II.

Compounds II in which R' is isopropyl may be and are preferably prepared by a series of reactions involving the reaction of the anthranilonitrile of the Formula III:

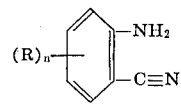

III wherein R (again excluding nitro and cyano) and $n$ are as previously defined, with an isopropyl halide of the Formula VII:

VII wherein X is halo which is either bromo or iodo, to obtain a 2-isopropylaminobenzonitrile of the Formula IVa:

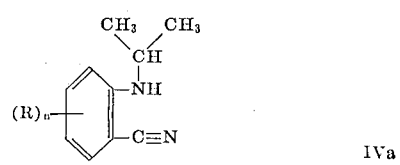

IVa wherein R, R' and $n$ are as defined above, said compound IVa then being reacted according to the previously mentioned known procedures with a phenyl Grignard compound of Formula V or a phenyllithium compound of Formula VI to obtain a compound of Formula II in which R' is isopropyl.

Compounds of Formula IV in which R' is isopropyl, i.e., compounds IVa, are preferably prepared by the above-illustrated novel reaction of a compound of Formula III with the isopropyl halide of Formula VII. The reaction is desirably carried out in the presence of base, preferably an inorganic base, such as an alkali metal carbonate, to take up the hydrogen halide liberated during the reaction. One may also employ a suitable inert organic solvent, e.g., dioxane, benzene or toluene. However, the use of a solvent is not necessary and a substantial excess of the isopropyl halide of Formula VII may be and is preferably employed to provide the solvent medium as well as high yields of the desired compound IVa. The reaction is suitably carried out at elevated temperature which is not especially critical and preferably lies in the range of 70° C. to 140° C., more preferably 80° C. to 100° C. Compounds IVa may be obtained from the reaction mixture for subsequent use by conventional procedures.

The compounds III employed in producing compounds IV are known or may be prepared from known materials by established procedures. The present invention, however, provides a novel and efficient method of producing certain of the compounds of Formula III involving an o-halonitrobenzene of the Formula VIII:

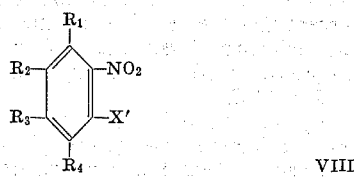

wherein:

each of $R_1$ and $R_4$ is, independently, hydrogen, lower alkyl, lower alkoxy, lower alkylthio, or trifluoromethyl, and each of $R_2$ and $R_3$ is, independently, hydrogen, halo of atomic weight not in excess of 80, lower alkyl, lower alkoxy, lower alkylthio or trifluoromethyl; at least two of $R_1$, $R_2$, $R_3$ and $R_4$ being hydrogen, and X' is halo of atomic weight not in excess of 80, preferably chloro, said compound of Formula VIII being reacted with cuprous cyanide to obtain a 2-nitrobenzonitrile of the Formula IX:

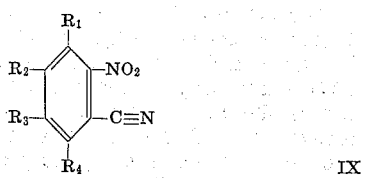

wherein $R_1$, $R_2$, $R_3$ and $R_4$ are as above-defined, said compound IX then being subjected to reduction in a manner known per se to obtain the corresponding anthranilonitrile.

The production of compounds IX by reaction of a compound of Formula VIII with cuprous cyanide is carried out at elevated temperatures and in the presence of an organic solvent, followed by hydrolysis and recovery in a conventional manner. Reaction temperatures may range between about 100° C. to 220° C., and preferably are in the range between 130° C. to 180° C. Any suitable inert organic solvent may be employed. The more preferred solvents are those higher boiling solvents boiling within the preferred range of reaction temperatures in order that reflux conditions may be employed, e.g., dimethylacetamide and dimethylformamide, more preferably dimethyl acetamide. The mole ratio of cuprous cyanide to compound VIII in the reaction mixture is not particularly critical and typically ranges from approximately the stoichiometric required to form the desired product up to a moderate excess. Reaction time is typically about 1 to 10 hours. The compounds VIII employed as starting material in the reaction to produce compounds IX are either known or can be readily prepared from known materials by established procedures.

The reduction of compounds IX to an anthranilonitrile of Formula III may be effected according to any of several well-known procedures. Preferably, the reduction is carried out in an aqueous acidic medium employing a reducing metal of which illustrative examples include iron, zinc and tin, preferably iron. Suitable acids are well known and include by way of illustration hydrochloric acid and acetic acid, preferably hydrochloric acid. Preferred temperatures are in the range of 50° C. to 100° C. The reduction is usually effected in an inert solvent of which any of the well-known suitable types may be employed. The preferred solvents include water and the lower alkanols, especially ethanol, and co-solvent combinations thereof. The product compound of Formula IV may be obtained from the reaction mixture for further use by conventional procedures. An alternate known method of producing compound III from compounds IX involves catalytic hydrogenation in a known manner employing Raney nickel, palladium or platinum as catalyst and a convenient organic solvent, for example, methanol, ethanol or dioxane.

In addition to their usefulness as starting materials for production of compounds of Formula IV, it will be evident that compounds of Formula III may be employed to produce other compounds including the corresponding 2-aminobenzophenones by reaction with a Grignard reagent according to known procedures. It will also be evident that the reaction enabling the production of compounds IX from compound VIII provides a novel and highly efficient route to compounds III, especially when compared to the elaborate multi-reaction routes heretofore available.

The compounds of structural Formula I are useful because they possess pharmacological activity in animals. In particular, the compounds are useful an anti-inflammatory agents as indicated by the Carrageenan-induced edema test on rats. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. In general, satisfactory results are obtained when administered at a daily dosage of from about 1 milligram to about 100 milligrams per kilogram of body weight, commonly about 20 mg./kg., preferably given in divided doses 2 to 4 times a day, or in sustained release form. For most mammals the administration of from about 10 milligrams to about 1000 milligrams of the compound per day provides satisfactory results and dosage forms suitable for internal administration comprise from about 3 milligrams to about 500 milligrams of the compound in admixture with a solid or liquid pharmaceutical carrier or diluent.

Example 1.—4-methyl-2-nitrobenzonitrile

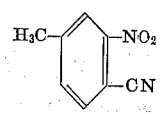

A mixture of 100 g. of 4-chloro-3-nitrotoluene, 60 g. of cuprous cyanide and 150 ml. of dimethylacetamide is refluxed for 4½ hours. The resulting dark brown mixture is poured onto 1 liter of ice water and the resulting mixture filtered to separate the precipitate dark brown copper complex which is then decomposed by treating with 600 ml. of methylene chloride with stirring at room temperature. The insoluble inorganic material is filtered off and the filtrate dried over anhydrous sodium sulfate, treated with 5 g. of charcoal and 50 g. of aluminum oxide and again filtered to remove insoluble material. The filtrate is evaporated to dryness in vacuo to obtain a crude crystalline residue which is then crystallized from diethyl ether to obtain 4-methyl-2-nitrobenzonitrile, M.P. 96–97° C.

Example 2.—4-methylanthranilonitrile

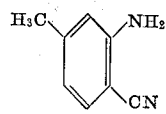

To a solution of crude 4-methyl-2-nitrobenzonitrile, obtained from Example 1, in 1.15 liters of hot ethanol is added 290 ml. of concentrated hydrochloric acid. To the resulting mixture at boiling is added a total of 75 g. of iron filings in 4 portions over a period of 1 hour. The resulting mixture is heated at reflux for an additional 1½ hours, cooled, filtered and the filtrate concentrated in vacuo to a volume of about 250 ml. The concentrated material is then diluted with about 1 liter of water to produce a crystalline solid which is recovered by filtration with suction and then washed on the filter with petroleum ether (B.P. 60–90° C.) to obtain 4-methylanthranilonitrile, M.P. 88–90° C.

Example 3.—2-isopropylamino-4-methylbenzonitrile

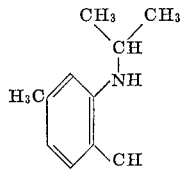

A mixture of 36 g. of 4-methylanthranilonitrile, 36 g. of potassium carbonate, 0.5 g. of copper powder and 120 ml. of 2-idopropane is refluxed with stirring for 8 days. The excess 2-iodopropane is removed by evaporation in vacuo and the resulting solid residue is extracted three times each with 100 ml. of methylene chloride. The extracts are combined, filtered through 250 g. of alumina and evaporated in vacuo to obtain a low melting crystalline residue which is 2-isopropylamino-4-methylbenzonitrile.

Example 4.—2-isopropylamino-4-methylbenzophenon imine

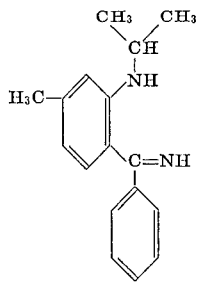

A solution of 5.22 g. of 2-isopropylamino-4-methylbenzonitrile in 40 ml. of diethyl ether is added with stirring over a period of about 10 minutes at room temperature to a solution of 90 millimole of phenyllithium dissolved in a 50–50 mixture of diethyl ether and benzene. Stirring is continued for an additional 15 minutes after such addition and then the resulting clear yellow solution is poured onto 200 ml. of ice water. The organic phase is separated, dried over anhydrous sodium sulfate and evaporated in vacuo to dryness to obtain a crude yellow oil of 2-isopropylamino-4-methylbenzophenonimine.

Example 5.—1-isopropyl-7-methyl-4-phenyl-2(1H)-quinazolinone

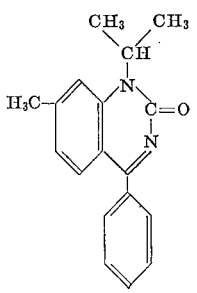

By reaction with ethyl chlorocarbonate.—A mixture of 5 g. of 2-isopropylamino-4-methylbenzophenonimine obtained from the preceding example, 3 ml. of ethyl chlorocarbonate and 30 ml. of benzene is refluxed for 2½ hours. The resulting mixture is diluted with 70 ml. benzene and then extracted twice with water. The organic phase is dried and evaporated in vacuo to produce a crude product which is purified by column chromatography employing alumina and chloroform as eluent. The purified product is then crystallized from diethyl ether to obtain 1-isopropyl-7-methyl-4-phenyl-2(1H)-quinazolinone, M.P. 135–137° C.

By reaction with ethyl chlorocarbonate in presence of an trialkylamine.—The run immediately above is repeated except that the reaction mixture also includes 6 ml. of triethylamine. Crystallization from diethyl ether yields 1-isopropyl-7-methyl - 4 - phenyl-2(1H)-quinazolinone, M.P. 135–137° C.

By reaction with urethane.—A mixture of 5 g. of 2-isopropylamino-4-methylbenzophenonimine and 10 g. of urethane is heated at temperature of 180–190° C. for 2½ hours. The cooled reaction mixture is taken up with 50 ml. of methylene chloride, filtered to remove insoluble material, and the filtrate extracted with 50 ml. of water. The organic phase is dried, evaporated in vacuo and the residue crystallized from ethylacetate/diethyl ether (1:2) to obtain 1-isopropyl-7-methyl - 4 - phenyl-2(1H)-quinazolinone, M.P. 135–137° C.

By reaction with urethane in presence of Lewis acid.— The run immediately above is repeated except that the reaction mixture also includes 1 g. of zinc chloride. Completing the procedure as in the preceding run there is obtained on crystallization from ethylacetate/diethyl ether (1:2) crystals of 1 - isopropyl - 7 - methyl-4-phenyl-2(1H)-quinazolinone, M.P. 135–137° C.

By reaction with phosgene.—To a solution of 5 g. of 2-isopropylamino-4-methylbenzophenonimine in 50 ml. of benzene is added to temperature of 10° C. 60 ml. of a 12% solution of phosgene in benzene. The resulting solution is allowed to stand for about 10 minutes at room temperature and is then extracted with 50 ml. of 2 N sodium hydroxide. The organic phase is separated, dried over anhydrous sodium sulfate, evaporated in vacuo and the resulting residue crystallizes from diethyl ether to obtain 1 - isopropyl - 7 - methyl-4-phenyl-2-(1H)-quinazolinone, M.P. 135–137° C.

By reaction with 1,1'-carbonyldiimidazole.—When 2-isopropylamino - 4 - methylbenzophenonimine is reacted with 1,1'-carbonyldiimidazole in refluxing benzene, there is also obtained a good yield of 1-isopropyl-7-methyl-4-phenyl-2(1H)-quinazolinone, M.P. 135–137° C.

Example 6.—1-tert. butyl - 6 - nitro - 4 - phenyl-2(1H)-quinazolinone

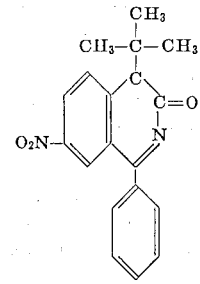

Step A: Preparation of 5-nitro-2-tert. butylaminobenzophenone.—To a solution of 20 g. of 2-chloro-5-nitrophenone, 20 ml. of ethanol and 30 ml. of tert. butylamine is added 1.5 g. of copper powder and 1.5 g. of cuprous chloride. The resulting mixture is refluxed for 5 days with stirring, the crystallized product precipitated, filtered and washed with ethanol to obtain yellow crystals of 5-nitro-2-tert. butylaminobenzophenone, M.P. 157–158° C.

Step B: Preparation of 5-nitro-2-tert. butylaminobenzophenonimine.—A mixture of 2 g. of 5-nitro-tert. butylaminobenzophenone, 15 ml. of anhydrous ammonia (low condensed air moisture content), and 20 mg. zinc chloride is heated in a sealed stainless steel cylinder at temperature of 110–120° C. for 3 days. Excess ammonia is evaporated from the resulting mixture and the residue recrystallized from ethanol to obtain yellow crystals of 5 - nitro - 2 - tert. butylaminobenzophenonimine, M.P. 146° C.

Step C: Preparation of 1-tert. butyl-6-nitro-4-phenyl-2(1H)quinazolinone.—To a solution of 1.3 g. of 5-nitro-2-tert. butylaminobenzophenonimine, and 5 ml. of triethylamine in 30 ml. of benzene is added 25 ml. of a 12% solution of phosgene in benzene at temperatures between 5° C. to 20° C. The resulting solution is allowed to stand at room temperature for 15 minutes and is then evaporated in vacuo to dryness. The residue is distributed by a liquid system composed of 50 ml. of 0.5 N sodium carbonate and 50 ml. of methylene chloride, followed by an additional extract of the aqueous phase with 30 ml. of methylene chloride. The combined methylene chloride solutions are dried over anhydrous sodium sulfate, evaporated in vacuo to dryness and the residue crystallized from ethyl acetate to obtain light yellow needles of 1-tert. butyl-6-nitro-4-phenyl-2(1H)-quinazolinone, M.P. 206° C.

What is claimed is:

1. A process for preparation of a 1,4-substituted-2(1H)-quinazolinone of the formula

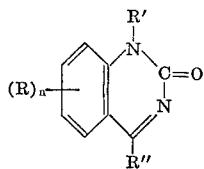

wherein:

R represents, independently, hydrogen; halo having an atomic weight no greater than 80; nitro; lower alkyl; lower alkoxy; lower alkylthio; cyano; or trifluoromethyl;

$n$ is 1 or 2, and when 2 then R is the same or different and either hydrogen, halo, lower alkyl or lower alkoxy, as defined above;

R′ represents lower alkyl; allyl; methallyl; or propargyl;

R″ represents phenyl; or substituted phenyl of the formula

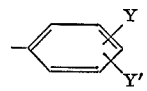

Y represents halo; lower alkyl; lower alkoxy; or trifluoromethyl; and

Y′ represents hydrogen; halo; lower alkyl; or lower alkoxy;

said process comprising reactively bringing together a 2-aminobenzophenonimine of the formula:

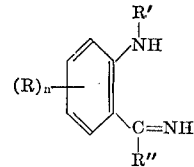

wherein R, R′, R″ and $n$ are as above defined, and a carbonic acid derivative selected from the group of phosgene, a lower alkyl chlorocarbonate, urethane and 1,1′-carbonyldiimidazole, provided that the carbonic acid derivative is phosgene when R′ is a branched alkyl having a tertiary carbon atom attached to the ring nitrogen atom.

2. The process of claim 1 in which the 2-aminobenzophenonimine is reacted with phosgene at a temperature in the range of 0° C. to 50° C.

3. The process of claim 1 in which R is lower alkyl, R′ is isopropyl and R″ is phenyl.

4. The process of claim 1 in which R′ is a branched alkyl having a tertiary carbon atom attached to the ring nitrogen atom.

5. The process of claim 1 in which the 2-aminobenzophenonimine is reacted with a lower alkyl chlorocarbonate at a temperature in the range of 30° C. to 150° C.

6. The process of claim 1 in which the chlorocarbonate is ethyl chlorocarbonate.

7. The process of claim 6 in which the reaction temperature is in the range of 60° C. to 100° C.

8. The process of claim 5 in which R is lower alkyl, R′ is isopropyl and R″ is phenyl.

9. The process of claim 1 in which the 2-aminobenzophenonimine is reacted with urethane at a temperature in the range of 140° C. to 200° C.

10. The process of claim 9 in which the reaction temperature is in the range of 160° C. to 180° C.

11. The process of claim 9 in which R is lower alkyl, R′ is isopropyl and R″ is phenyl.

12. The process of claim 9 in which the reaction is carried out in the presence of a catalytic amount of a Lewis acid.

13. The process of claim 12 in which the Lewis acid is zinc chloride.

14. The process of claim 1 in which the 2-aminobenzophenonimine is reacted with 1,1′-carbonyldiimidazole at a temperature in the range of 20° C. to 120° C.

References Cited

UNITED STATES PATENTS 3,453,179    7/1969    Greenspan et al. _____ 195—51

ALEX MAZEL, Primary Examiner

R. V. RUSH, Assistant Examiner

U.S. Cl. X.R.

260—465, 570; 424—251